United States Patent [19]

Sullivan

[11] 3,909,596

[45] Sept. 30, 1975

[54] SYSTEM FOR DETERMINING PROCESSING LOSSES OR GAINS

[76] Inventor: Frank E. Sullivan, 2 Burrell Ct., Tiburon, Calif. 94920

[22] Filed: June 18, 1974

[21] Appl. No.: 480,402

[52] U.S. Cl..... 235/92 PD; 235/92 FL; 235/151.34; 73/196
[51] Int. Cl.² .......................................... G01F 1/00
[58] Field of Search....... 235/92 PD, 92 FL, 151.34; 340/213 Q; 73/195, 196, 198

[56] References Cited
UNITED STATES PATENTS

| | | | |
|---|---|---|---|
| 2,966,059 | 12/1960 | Dower | 73/196 |
| 3,711,689 | 1/1973 | Park | 73/196 |
| 3,723,987 | 3/1973 | Barone, Jr. et al. | 73/196 |

Primary Examiner—Kathleen H. Claffy
Assistant Examiner—George G. Stellar
Attorney, Agent, or Firm—Owen, Wickersham & Erickson

[57] ABSTRACT

Method and apparatus for providing substantially instantaneous reading and recording of processing losses and gains from a continuous liquid chemical process, such as refining of vegetable oil. The product inflow into and the product outflow from the process are separately and continuously measured. The measuring device is used to generate electronic pulses corresponding to the measurement, preferably at a rate in the order of, typically, about one hundred pulses per pound of liquid. High speed pulse counters electronically count these pulses, and gate means is actuated each time the pulses coming from either pulse stream reach a total of, say, 10,000. Then, the total count needed for the other pulse stream to reach the same total is determined and is displayed in terms of processing gain or loss percent, to the nearest tenth of 1%. Both counts then start over, and the counting cycles go on continuously. Temperature and moisture corrections may be applied, and an averaging or pulse selection system may be employed to avoid recording or displaying the instantaneous fluctuations that occur within the process system, thereby smoothing out the variations from the average or basic flow rates.

27 Claims, 10 Drawing Figures

TEMPERATURE DETECTOR AND COMPENSATOR

SYSTEM FOR DETERMINING PROCESSING LOSSES OR GAINS

BACKGROUND OF THE INVENTION

This invention relates to a method and apparatus for providing continuous recording and instantaneous display of processing gain or loss in a continuous liquid chemical process.

For example, the invention may be used to achieve greatly improved efficiency in the caustic refining of vegetable oils. By knowing exactly what the process losses are and knowing them within a few seconds of the time they are measured, the production control staff is able to make adjustments of the different operating parameters of the refining process to improve efficiency and to adjust the losses to a proper figure. The ability to make immediate adjustment enables operation at maximum yields. Similarly, other liquid processing can be controlled and improved.

The prior art has determined refining losses in a relatively crude manner. Thus, a feed tank was weighed or measured in volume by using a dip stick, then the process was run for a period of time to consume all this feed material, and an outflow storage tank had its contents weighed or the volume determined as by a dip stick, and the loss was calculated. The resultant figures were slow in arriving at the production control office, often as much as a month late.

In the late 1950's, the present inventor developed a clinical laboratory method for determining refining loss. As applied to the oil refining processes, samples of the lye, the crude oil with the lye, the refined oil, and the soap stock, were all collected at the same instant. The laboratory then analyzed each sample for sodium and calculated the refining loss. This process required between two and four hours; and, in any event, the refining loss was past history by the time it was known.

A more recent prior-art development used to monitor leaks in pipelines generates slow-speed pulses (1-25 Hz) corresponding to approximately one pulse per pound, or about one to 10 per barrel. One train of pulses is generated by inflow into the pipeline and the other by outflow therefrom. Alarms are activated by predetermined discrepancies to indicate leaks. In addition, the device employs an up-down counter and displays the difference in pulses. Timers reset the difference display and counters to zero from time to time—usually many minutes or even hours. The process uses mechanical counters,—one reason for the relative slowness of this prior-art system.

An object of the present invention is to determine the actual process losses or gains substantially instantaneously and to display these losses or gains, changing the display at typical intervals of approximately ten seconds to two minutes, while also recording the process losses or gains. As a result, once a process run is started and reaches a steady on-stream condition, the plant operator always knows through the run his process loss or gain. For example, if a refining loss is higher than expected, he can take corrective action, such as changing the operation of the separating zone in the centrifuge, changing the caustic treatment, changing the mix conditions, or changing the temperature. Any effect of the process condition which is so changed shows up nearly immediately on the display panel, and the panel indicates whether the proper corrective action is being taken.

SUMMARY OF THE INVENTION

Suitable flow-measuring devices, such as positive displacement meters, are located at the beginning and end of the process which is to be monitored. That is, one flow-measuring device is located in the inflow stream to the process (or process step) which is to be monitored, and the other is located in the outflow stream leading from that process or process step. Of course, several process steps may be monitored separately or these may be an overall monitoring of several steps, or both.

Each flow-measuring device is used to drive an electronic pulse generator, to produce pulses in the order of several hundred pulses for each revolution of the generator. This typically corresponds to approximately 100 pulses per pound of the liquid being processed. The generators produce equal pulses for equal flow rates. The pulses from each of the two generators are corrected for temperature and are then fed to separate high-speed pulse counters. The two counters are connected to electronic gate circuitry, and both begin to count pulses at the same point in time and whichever counter first counts 10,000 pulses (for example) actuates a gate. When this gate is actuated, the counter which actuated it stops, and the counter for the other stream continues to count and also sends the subsequent pulses to a third counter, to determine the difference between the first two counters at the time that the first counter reaches 10,000. When the second count reaches 10,000, the count of the third counter—the difference count—is displayed as a processing gain or loss, depending on whether the inflow stream counter or the outflow stream counter first reached 10,000. The first two counters then begin to count over again up to 10,000, and the counting and displaying process is continuously repeated.

If the material is non-aqueous, such as a vegetable oil, and if it is desired to compensate the results for moisture present, as known from laboratory analysis, then the known inflow and outflow moisture contents are programmed into the circuits so that pulses representing such moisture content are subtracted in the counting process. Circuitry automatically adjusts the percentage figures for gain or loss that are displayed.

In addition to the display device, recording means may be provided to plot the gain or loss graphically or to print out the gain or loss digitally along with the time.

The system may also have what may be considered averaging means, such as a pulse frequency selector so that not every pulse is counted, but every second or third or fifth or tenth or one hundredth, or some other intervalic limitation is imposed. This enables the device to go over a longer period of time and to avoid indicating minor surges or fluctuations within the operating system.

The count of 10,000, while an ideal figure for many uses, is used as an example only, and the final count may have any desired magnitude that is suitable.

Other objects and advantages of the invention will become apparent from the following description of a preferred embodiment.

DETAILED DESCRIPTION OF A PREFERRED EMBODIMENT

Figures 1, 8:
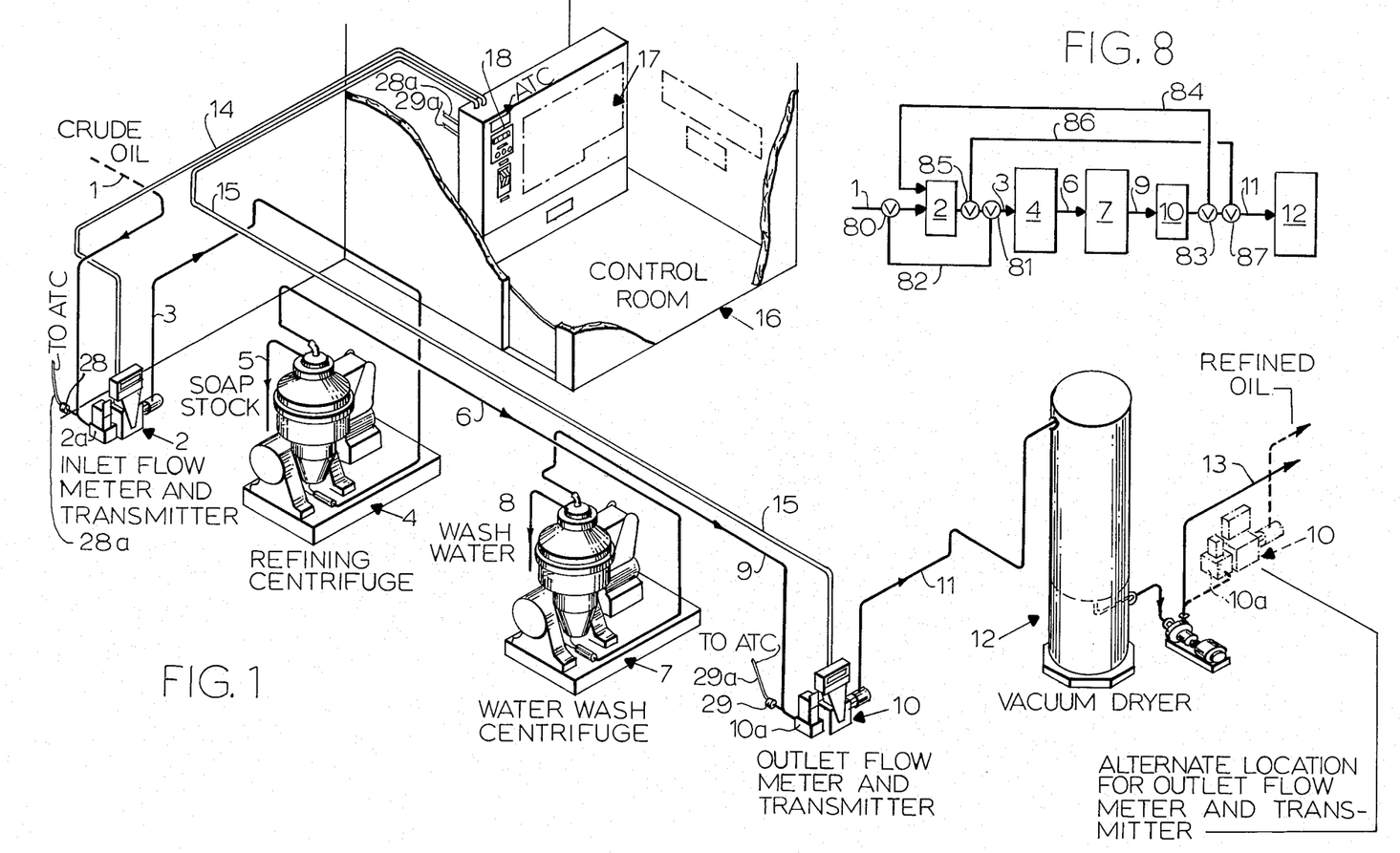
FIG. 1 is a somewhat diagrammatic representation of a vegetable-oil-refining system employing a loss-calculating system embodying the principles of the present invention.
FIG. 8 is a block diagram of the FIG. 1 process showing how factoring may be done to compensate for mechanical differences in the two flow meters.

As shown in FIG. 1, crude (or degummed) vegetable oil from a suitable storage area is introduced into a process pipe 1 and is fed according to the present invention through an inlet flow meter 2, which measures the inflow of oil at this point. From there a pipe 3 leads (usually via a heater, which is not shown here) to a refining centrifuge 4 in which the oil is subjected to lye and from which soap stock is withdrawn through pipe 5. The vegetable oil continues from the centrifuge 4 through a pipe 6 (and often another heater) to a water-wash centrifuge 7 (where heated water is used to wash out remaining lye) from which wash-water is withdrawn through a pipe 8. The then purified oil passes through a pipe 9 to an outlet flow meter 10, which measures the outflow of oil at this point, after processing losses (or gains) have occurred. From there the oil goes via a pipe 11 to a vacuum dryer 12. As shown also, in this device the outflow meter 10 may be located beyond the vacuum dryer. Refined vegetable oil leaves via a pipe 13.

Each flow meter 2 and 10 has an associated electronic signal transmitter 2a and 10a. The two transmitters 2a and 10a send signals by cables 14 and 15 to a control room 16 which is provided with a control panel 17 including a panel 18 which is shown in more detail in FIG. 6 and comprises the display for the present invention. The control room 16 also contains control devices for varying the operation of the centrifuges 7 and 10, varying the addition of lye, and otherwise varying the refining parameters.

It will be apparent that by keeping a close quantitative check on the beginning and end of the process the efficiency of the refining process can be determined, especially since chemical calculation enables one to set an ideal.

According to this invention, each of the transmitters 2a and 10a sends a square wave outflow from a high-speed pulse generator to an electronic calculator located behind the central control panel 17 in the control room 16.

Figure 2:
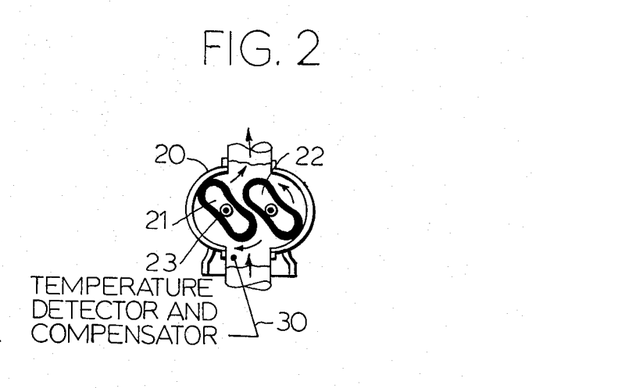
FIG. 2 is a view showing in somewhat diagrammatic form a typical positive displacement meter having a pair of rotors, one of which is used to drive an electronic pulse generator.

The basic idea here is to generate pulses that depend on the amount of oil passing through the meters 2 and 10. It may be helpful to give an example of how such pulses may be generated. In the presently preferred form, the flow meters 2 and 10 may each comprise a positive displacement meter 20 which has at least one rotor 21 and usually has two rotors 21 and 22 (See FIG. 2). By using highly accurate positive displacement meters 20 with close but not touching rotors 21,22—they are usually machined within a tolerance of 0.002 inch clearance—the liquid forms a capillary seal that avoids leakage. In place of these meters, turbine meters or other suitable flow-measuring devices can be used.

Figure 3:
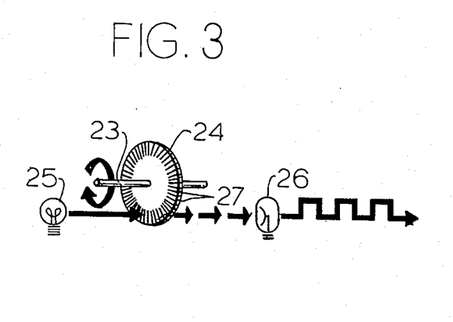
FIG. 3 is a diagrammatic view showing a meter-driven photoelectric system for generating the electronic pulses, which are in the form of square waves.

Each rotor 21 (or a suitable member of some other type of meter) rotates (directly or indirectly) a shaft 23 of an electronic pulse generator (FIG. 3). The shaft 23 rotates a slotted disc 24 located between a light source 25 and a light sensor 26. Such devices are well known. Each time a slot 27 or the disc 24 crosses the light beam, a flash of light passes through the slot 27 and goes to the photosensitive sensor 26, resulting in emission of a pulse. By this means, several hundred or even more than a thousand pulses per revolution may be produced by both an inflow pulser 30 and an outflow pulser 31, as shown in block diagram in FIG. 4. These pulses may be shaped or their voltage amplitudes reduced, if desired, by well-known means.

Both meters 2 and 10 may be mechanically temperature compensated by well-known means, or the signals from the pulsers 30 and 31 may be electronically temperature compensated. The purpose is to relate the subsequent measurements to a standard temperature, so as to correct for changes in volume due to temperature variations. In other words, the refining losses are to read as though taken at an arbitrarily selected temperature, such as 60°F. This is important because the inflow and the outflow may be at quite different temperatures. For example, the inflow might be at 65°F. and the outflow at 140°F. Temperature sensors 28 and 29 (See FIGS. 1 and 4A) (Suitable ones may be purchased on the market) sense the temperature of the oil and send signals via leads 28a and 29a to the control room 16 where converters 32 and 33 electronically convert the sensed temperatures into terms of percentage of volume change of the oil. In other words, known calculating devices combine the temperature deviation from the selected standard (e.g., 65°) with the temperature coefficient of expansion of the oil to determine the deviation in oil volume from what it would be at the selected temperature. These percentages of deviation are then used to modulate the signals from the respective pulses 30 and 31. Each modulator 34,35 may, for example, substract the increase in volume due to temperature increase by subtracting a percentage of the pulses corresponding to the volume percent deviation. For example, if the volume increase due to temperature were 2.5%, each fortieth pulse would be canceled, canceling thereby 250 of each 10,000 generated.

If the volume change due to the temperature deviation is a reduction in volume, a percentage of pulses is added. For this purpose, as is known, a separate pulse generator clocked by its associated pulser 30 or 31 may generate twice as many pulses as the pulser 30 or 31 with which it is associated, the pulses that are synchronized with those of its associated pulser 30 or 31 are canceled, and a selected number of the remaining pulses is added to those generated by the pulser 30 or 31. So, if the volume were reduced by 1.25%, every eightieth pulse generated by the pulser 30 or 31 would be followed by an additional pulse from the modulator 34 or 35, inserted before the 81st pulse from the pulser 30 or 31, giving 125 more pulses per 10,000 generated.

Figure 4A:
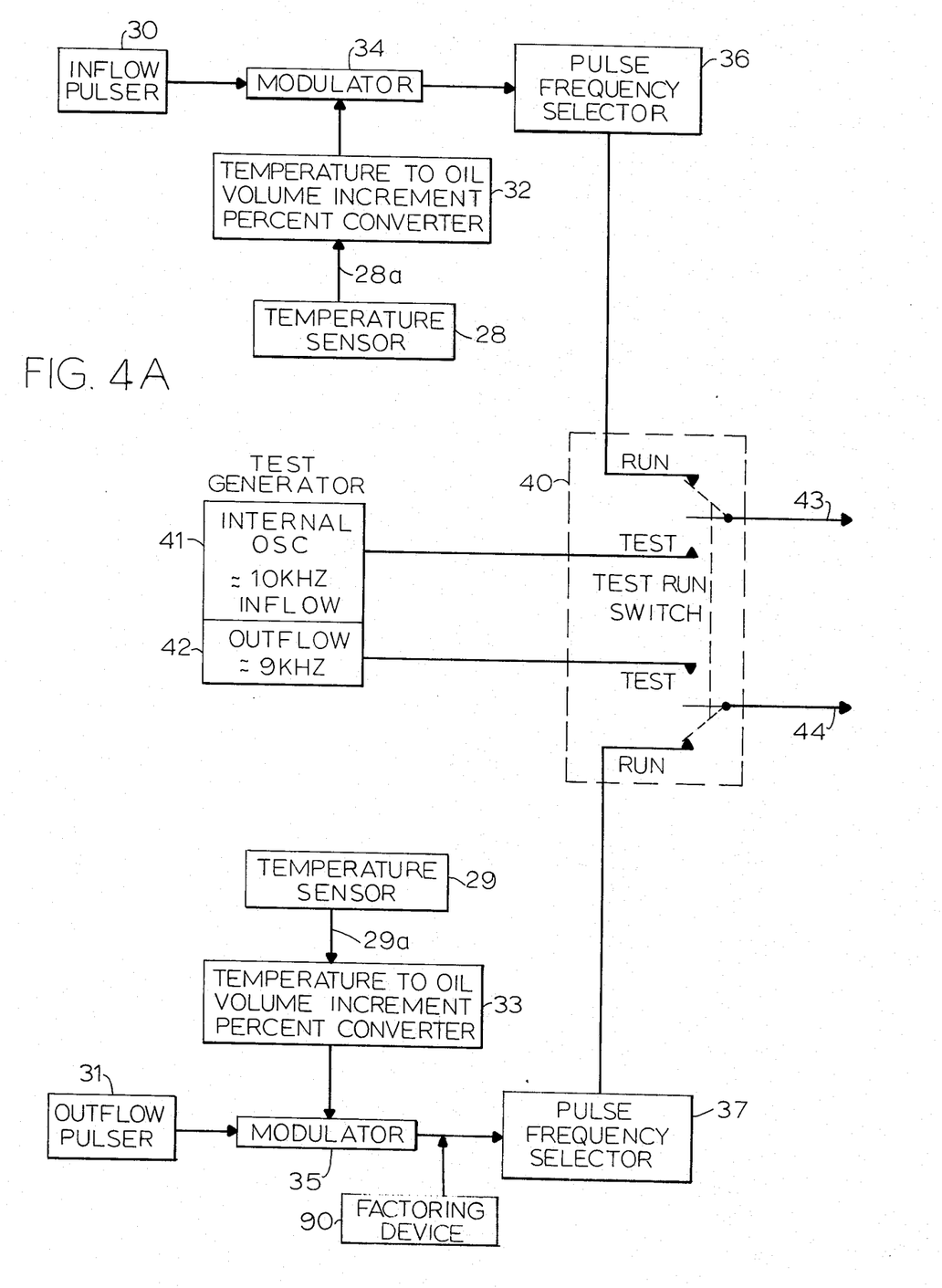
FIG. 4 is an electronic flow diagram in block form, comprising FIGS. 4A, 4B, and 4C on three successive sheets, showing the various stages in the determination of process gains or losses.
Figure 7:
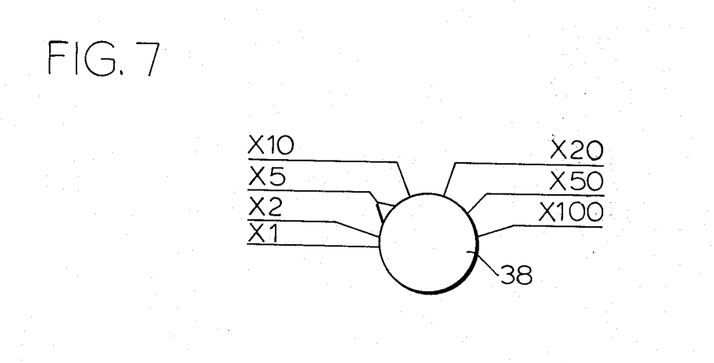
FIG. 7 is a view in diagrammatic form of the setting dial for a pulse frequency selection switch or averaging device.

As shown in FIG. 4A, the adjusted signals go from the respective temperature modulators 34 and 35 to respective pulse frequency selectors,—an inflow pulse frequency selector 36 and an outflow pulse frequency selector 37. Both selectors 36 and 37 are controlled by a single switch 38, shown in FIG. 7 which enables the user to choose which pulses are to be selected for counting. It enables him to select whether every pulse is to be counted, or every second pulse, every fifth pulse, every 10th pulse, every 20th pulse, every 50th pulse, or every 100th pulse, for example.

The purpose of the selectors 36 and 37 is to solve a problem found in most liquid processing systems. The actual flow of the material through the process tends to be subject to short-term rapid fluctuations. Just as a house thermostat when set to 70° usually gives a range of temperatures from about 68° to 72° (in other words, shutting off at 72° and turning the heat on again at 68°) so the devices which regulate the flow in the two centrifuges 4 and 7 may cause the instantaneous flow to fluctuate even though maintaining a substantially constant flow rate per minute. As a result, in any brief period, such as five or ten seconds, there may be a significant difference between the instantaneous inflow and the substantially constant inflow rate, and there may be a similar significant difference of outflow. These instantaneous differences of inflow and outflow may or may not coincide and may be even at opposite peaks. Thus, a minimum outflow may occur at the same time that there is a maximum inflow, and vice versa. If the display change because of this phenomenon is too rapid in showing values that diverge or deviate from the true average input, and if the chart plotted by the device shows a jagged line corresponding to the instantaneous flows—what is actually happening—this may be disconcerting to the control engineer and may be undesirable to him from the standpoint of control.

As a result, it is often wise to count only selected pulses, that is, every other pulse, or perhaps even every hundredth pulse, and the switch 38 gives a choice of which frequency to select. The counters, later to be described, will still count to their selected number, such as 10,000, but if the switch 38 is in its X-2 position, only every other pulse is counted and actually 20,000 pulses are emitted while 10,000 are counted. Similarly, at the X-50 position, every 50th pulse is counted and therefore 500,000 pulses are emitted while 10,000 are being counted. The other factors give other similar effects. As a result, the longer periods enable the recorder to plot what is more nearly a straight line instead of an irregular jagged curve or a tremulous sine wave. If the averaging effect is not desired, the switch 38 is turned to the X-1 position, and every pulse coming from the modulator 34 or 35 will be counted. The selectors 36 and 37 are, of course, ganged so that the single switch 38 controls both of them simultaneously.

From the selectors 36 and 37, the two pulse trains go to a test-run switch 40 having two positions, one for "test" and one for "run". In its run position, the switch 40 sends the two pulse trains coming from their respective selectors 36 and 37 on to the remainder of the device; in the test position a test generator comprising two internal oscillators 41 and 42 provide a check. Thus, internal oscillator 41 may generate a known 10 kHz inflow and this 10 kHz inflow is applied as inflow pulses to be counted. Also, oscillator 41 is used with oscillator 42 to furnish a 9 kHz outflow pulse train. Since these figures can be exact, a known signal is sent into the device and therefore the accuracy of that device can be checked simply by observing the outflow display of the apparatus.

Figure 4B:
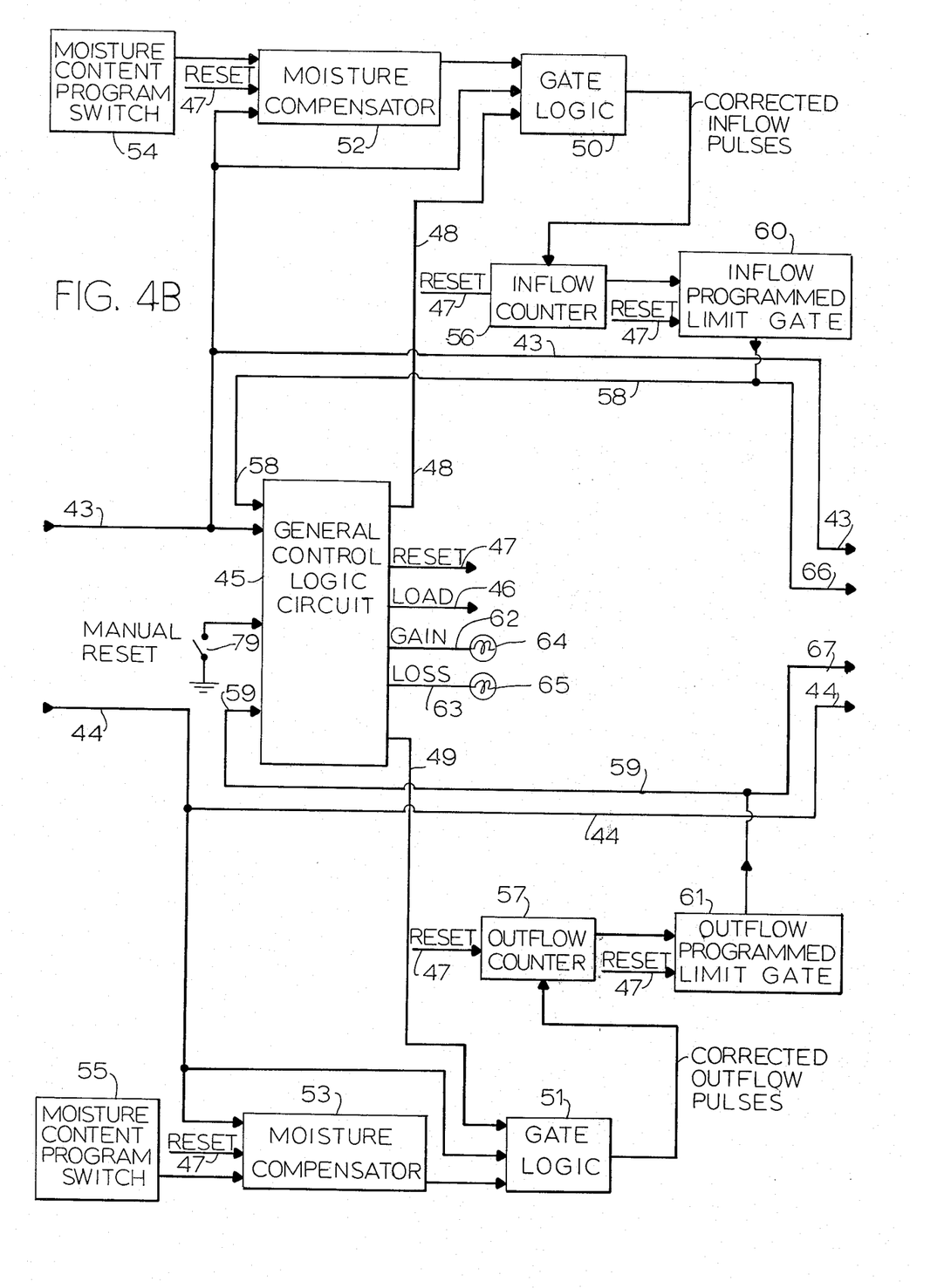
Figure 4C:
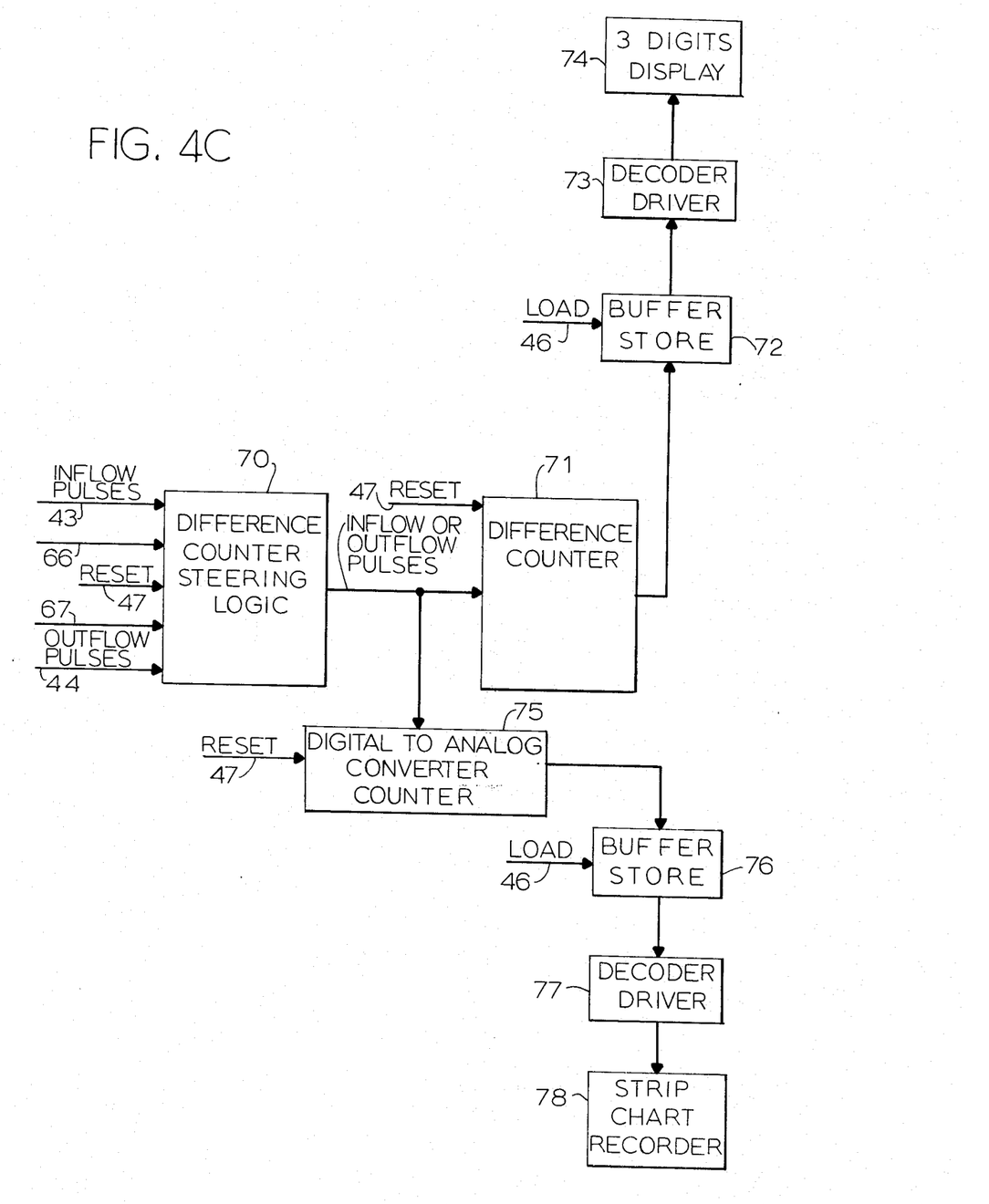

Two signals 43 and 44 come out of the switch 40, whether test signals or run signals, and they then go to the calculator portion of the apparatus, shown diagrammatically in FIG. 4B. Thus, the inflow signal 43 goes to a general control logic circuit 45, which will be described functionally, the first pulse of each such set to be counted serving as an initiating clock pulse to initiate successively, the load circuit 46, then the reset circuit 47, and then by leads 48 and 49 to clock two gate logic circuits 50 and 51. The inflow and outflow pulse trains 43 and 44 also go at the same time to respective moisture compensators 52 and 53 and to the respective gate logic circuits 50 and 51. This operation is indicated on the time-function diagram of FIG. 5, where the operation or function lines are lettered A through P in relation to a time cycle from left to right. Line A shows the pulses of the inflow pulse train 43 and line B shows the pulses in the outflow pulse train 44; the showing is indicative only, for there is no space to show all of the pulses. When the power comes on at time $a$, there is a suitable lapse for warm-up followed at time $b$ by simultaneous energization of the load circuit 46 and the reset circuit 47; in all later cycles these energizations are preferably successive rather than simultaneous, as shown at $b_1$ and $b_2$ at the right of FIG. 5. The pulse $b$ loads the indicator to display all zeros, and resets all the gates and counters to this initial or zero-count position. Then at point $c$ the leads 48 and 49 actuate the gate logic circuits 50 and 51.

Two moisture content program switches 54 and 55 are used to compensate for the presence of moisture both in the inflow and outflow. For example, the moisture at inflow and outflow may be predetermined by suitable moisture analysis, manually applied to the switches 54 and 55 and thereafter left unchanged for a given batch of oil. The switches 54 and 55 then supply their signals or setting to the respective moisture compensators 52 and 53. What basically happens is that if the moisture content is say 0.4% for inflow, then this 0.4% corresponds to a count of 40 pulses in relation to a total of 10,000 to be counted; so the first 40 pulses of the train 43 are canceled out (not passed on) by the gate logic 50 and do not flow into the inflow counter 56. Similarly, if the outflow moisture content is computed to be 0.7%, then this corresponds to a count of 70 relative to a count of 10,000, and the first 70 pulses of the outflow train 44 are similarly withheld by the gate logic 51 and are not counted by the outflow counter 57. This means that the moisture compensation requires pulses in excess of the number of pulses that are counted. For example, for a 0.4% inflow of moisture and 0.7% outflow of moisture, then in order to reach 10,000 at each counter 56, 57 there will actually have been emitted in that cycle 10,040 inflow pulses and 10,070 outflow pulses.

Figure 5:
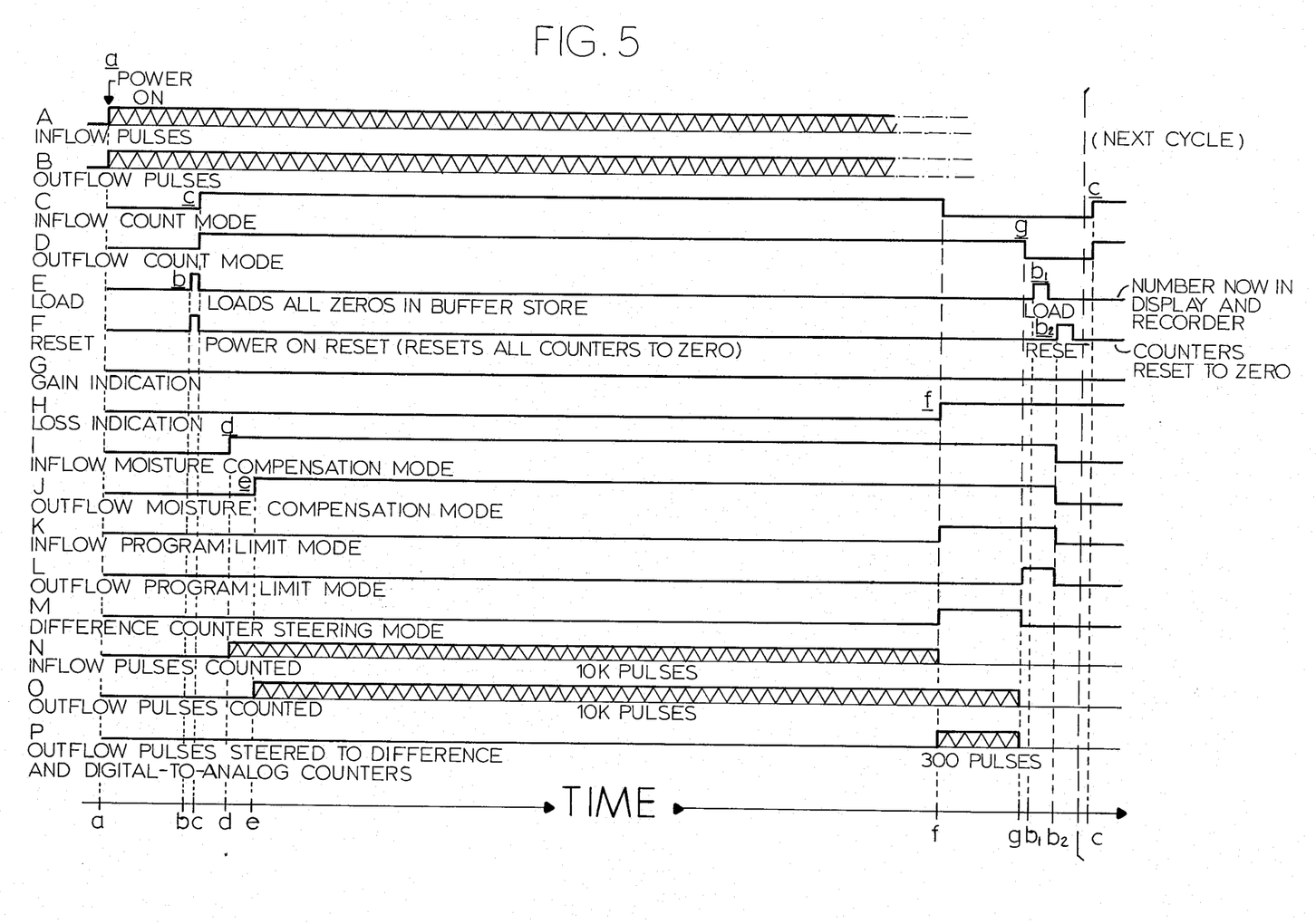
FIG. 5 is a clock pulse functional diagram for some typical conditions of the device of FIG. 4.

The moisture compensators 52,53 and the gate logic circuits 50 and 51 thus perform the function of applying the moisture compensation and withholding the starting of the inflow counter 56 and the outflow counter 57 until the moisture compensation has been taken care of in the manner described. This is shown in FIG. 5 by the inflow count mode C and outflow count mode D, both of which are initiated at time $c$. The completion of the 40 count by the moisture compensator 52 occurs at time $d$ in line I, and this causes the initiation of the inflow pulses counted, line N at $d$. The completion of the 70 count by the moisture compensator 53 occurs at time $e$, at line J, and the initiation of the outflow pulses counted occurs at time $e$ on line O.

After the moisture compensation has been made, the gate logic circuits 50 and 51 send their respective pulse trains to the inflow counter 56 and the outflow counter 57. Both of these counters start counting (at times $d$ and $e$ respectively in lines N and O) and whichever one reaches 10,000 first (or whatever is the selected total count number; 10,000 is a very helpful number to use since it enables an easy expression in percentage) actuates its associated programmed limit gate 60 or 61, lines K and L, FIG. 5. The first gate 60 or 61 to be actuated actuates the general control logic circuit 45 via line 58 or 59. This occurs at time $f$ in FIG. 5 and the effects on lines C, H, K, M, N and P are shown. The inflow count mode C is terminated when the program limit mode K is actuated at $f$.

The general control logic unit 45 determines which one of the counters 56 or 57 reached 10,000 first. The one that reached it first determines whether there has been a process gain or a process loss, and accordingly the control logic circuit immediately, at time $f$ sends a signal to either a gain circuit 62 to light a lamp 63 or to a loss circuit 64 to light a lamp 65. Once a lamp 64 or 65 is lighted it will stay lighted until there is a change in a subsequent circuit. This is shown in FIG. 5 at lines G and H, only line H being affected here, because in this example there is a process loss.

The first gate 60 or 61 to be actuated also sends a signal to a difference counter steering logic device 70 (shown in FIG. 4C) and informs that device that one of the two counters 56,57 has reached its count of 10,000 and that now a difference count is to be made of the number by which the other counter 57,56 is short of 10,000.

The signals from the steering logic circuit 70 are sent to two different places, the first one being a digital difference counter 71 which is preferably a binary coded decimal device, preferably in four digits, which counts the pulses by which the second counter was short of 10,000. The difference counter 71 (line P in FIG. 5) is initiated at time $f$ and from then on receives pulses (via the steering logic circuit 70) from the pulse train 43 or 44 which has not completed its full count. In this example this is the outflow pulse train 44 (see line O in FIg. 5). The difference counter 71 counts the pulses from then on as they are counted by the counter 57 until the counter 57 reaches its count of 10,000 at time $g$ in FIG. 5, line O. Then the limit gate 61 (line L) notifies the general control logic circuit 45 via lead 59 that the counting cycle is complete, terminates the outflow count mode, line D, and gives the sensing information to the difference counter steering logic 70, stopping the sending of pulses therebeyond.

The difference counter 71 then actuates a buffer store 72, which also immediately thereafter receives a load signal from lead 46, which also carried the power on reset. The buffer store 72 then feeds the number counted from the difference counter 71 into a decoder driver 73 which actuates a display device 74. The device 74 may comprise any suitable type of digital operation, and it provides a digital display. Displaying three digits means that the last digit is dropped in order to give greater accuracy instead of giving a false impression of accuracy that is not likely to exist.

The other signal from the steering logic circuit 70 goes to a binary digital-to-analog converter 75 which counts the same pulses as the difference counter 71 but in a binary system, and, on completion of its count, sends a signal to a buffer store 76 resembling the buffer store 72. The buffer store 76 actuates a decoder driver 77 which converts the signal from its original digital nature to an analog type of expression, for example, the movement of a needle or stylus or other writing instrument for a strip chart recorder 78. This may be done in any of several different ways. The strip chart recorder 78 then makes its recording, while the display device 74 makes its display.

As FIG. 5 shows, the actuation of the outflow program limit mode L at time $f$ is quickly followed by times $b$, $b_2$, and $c$, and the next cycle begins.

Figure 6:
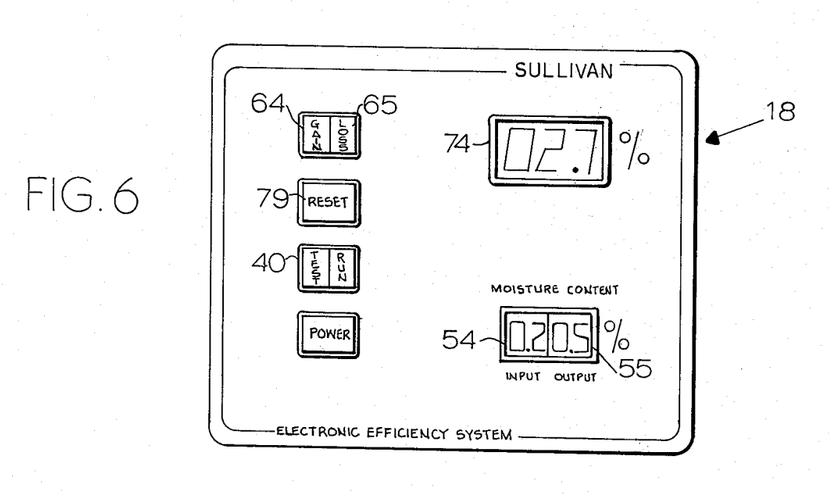
FIG. 6 is a view in front elevation of a display panel for a device embodying the principles of the invention, including the moisture compensation setting wheels.

One embodiment of a control panel 18 is shown in FIG. 6. The power switch, the test run switch 40 and the reset switch 79 are shown as illuminated pushbuttons in panel 18. The reset switch 79 is electrically connected to general control logic circuit 45, as shown in FIG. 4B, and permits the plant operator to generate a manual reset pulse which interrupts any existing cycle, resets all counters to zero and causes a new cycle to commence as previously described. Process gain lamp 64 and loss lamp 65 are shown on the panel in the same format as the pushbuttons previously described. The three digits digital display 74 also appears on panel 18 as does the moisture content program switches 54–55 which are shown as rotary thumbswitches with numerals engraved therein.

From time to time it is possible to make a check on the accuracy of the flow meters by using the valve and flow arrangements shown in FIG. 8. In FIG. 8 the reference numerals 1 through 12 refer to the same elements that they were referring to in FIG. 1. In this instance, the inlet flow meter 2 can be bypassed by the crude oil, by means of a pair of valves 80 and 81 and a bypass inflow line 82, which send the unrefined oil around the inlet flow meter 2 and directly to the refining centrifuge 4. Then it goes, as before, through the water-wash centrifuge 7 and then to the outlet flow meter 10. Then a second bypass arrangement includes a valve 83 beyond the flow meter 10, which sends the material via a conduit 84 back to the inlet flow meter 2. Then from the inlet flow meter 2, a valve 85 and conduit 86 deliver the material via a valve 87 to the conduit 11 and send it on to the vacuum dryer 12. Inspection of FIG. 8 will show that the outlet flow transmitter 10$a$ should, under these circumstances, be transmitting flows identical to the inlet flow transmitter 2$a$, identical flows are put through their meters 2 and 10. This enables determination of whether by wear or misadjustment anything is wrong with the flow meters 2,10 or their transmitters 2$a$,10$a$ and therefore enables a check on their accuracy from time to time. This need not be done often, but if done regularly will serve to ensure the operator that the device is operating satisfactorily.

For the purposes of this check, the moisture compensators 52 and 53 are given identical settings. The temperature compensators 32 and 33 adjust the values for any temperature differences between the flow meters 2 and 10. Hence, the display device 74 should read 0.00 to indicate that there is no difference between input flow at 2 and output flow at 10, for there should not be any difference.

If the check shows that there is a difference, as expressed by the display device 74, then the inflow and outflow streams require a correction of the calibration type. This may be done by a factoring device 90 shown in FIG. 4A which acts on the signal from one modulator (e.g., the modulator 35 for the outflow stream). Direct digital multiplication may be used to correct the outflow pulse stream so that the display device 74 reads 0.00; then the process can go back on stream.

Where mechanical temperature compensation is employed and there is no modulator, the same result can be achieved by mechanically adjusting the output shaft register for the flow meter by using a micrometer dial.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A method for providing a substantially instantaneous reading of processing gain or loss from a continuous liquid process, comprising:
   continuously measuring both the product inflow into said process and the product outflow from said process,
   generating pulses corresponding to each of the inflow and outflow measurements,
   counting the pulses corresponding to the inflow and the pulses corresponding to the outflow,
   when a predetermined set number of pulses has been counted from either inflow or outflow, whichever is first, counting how many pulses it takes the other one to reach that same number, thereby providing a difference count,
   then starting each of the inflow and the outflow to begin counting again toward the same number, and
   displaying the difference count while indicating whether it is processing gain or loss, depending on whether the inflow or outflow counting first reached said number.

2. The method of claim 1 wherein the pulses corresponding to the inflow and the pulses corresponding to the outflow are generated at a rate in the order of about one hundred pulses per pound of product flow and the predetermined set number of pulses is ten thousand and the processing gain or loss is displayed in numerals corresponding to the percentage of product gained or lost in the process.

3. The method of claim 1 wherein inflow pulses and outflow pulses are corrected for moisture content present in the product by
   determining the percentages of moisture to product at inflow and outflow,
   converting said percentages to an inflow pulse control signal and an outflow pulse control signal,
   reducing the number of inflow pulses by a number that corresponds with the percentages of moisture content present at the inflow before said predetermined set number is reached,
   simultaneously reducing the number of outflow pulses by a number that corresponds to the percentage of moisture content present at the outflow before said predetermined set number is reached.

4. The method of claim 1 wherein inflow pulses and outflow pulses are corrected for temperature variations in product inflow and outflow by
   sensing the temperature at inflow and outflow,
   comparing said temperatures algebraically with a predetermined standard product temperature to produce an inflow temperature correction signal and an outflow temperature correction signal,
   varying the number of inflow pulses in accordance with the inflow temperature correction signal before said predetermined set number of pulses is reached,
   simultaneously varying the number of outflow pulses in accordance with the outflow temperature correction signal before said predetermined set number of pulses is reached.

5. The method of claim 1 wherein inflow and outflow pulses are corrected for momentary transient fluctuations by
   selecting a switched variable fraction of inflow pulses generated and then counting said fraction,
   simultaneously selecting the same switched variable fraction of outflow pulses and then counting said fraction.

6. The method of claim 1 wherein internal functioning of apparatus used in the method may be selectively tested by
   generating a known number of simulated inflow pulses and simultaneously generating a different known number of simulated outflow pulses,
   replacing the pulses corresponding to the inflow with said simulated inflow pulses and simultaneously replacing the pulses corresponding to the outflow with said simulated outflow pulses,
   reading the difference count which should correspond to the difference in number between said simulated inflow pulses as known and said simulated outflow pulses as known.

7. The method of claim 1 wherein accuracy of the method may be selectively tested by reversing the product inflow and outflow and comparing a display resulting therefrom with the display of the difference count resulting from the normal product flow, and ascertaining that both displays are equivalent.

8. A method of providing a substantially instantaneous reading of processing gain or loss from a continuous liquid process, comprising:
   continuously measuring both the product inflow into said process and the product outflow from said process,
   generating pulses corresponding to each measurement in the order of about one hundred pulses per pound of product flow,
   counting said pulses, helping separate the inflow count from the outflow count,
   when 10,000 pulses have been counted from either the inflow or the outflow, whichever is first to reach 10,000, determining how many pulses the other one is short of 10,000 to provide a difference count, then starting each one to count again from zero, and displaying the difference count, except for the units digits, as percent gain or loss correct to the nearest tenth of one percent, while indicating whether it is a gain or a loss.

9. The method of claim 8 wherein the values are corrected for moisture present in an otherwise non-aqueous product by determining the moisture percentages at both inflow and outflow, multiplying each percentage by 100, subtracting the inflow moisture multiple from 10,000 immediately upon the completion of the count of 10,000 and simultaneously subtracting the outflow moisture multiple from the pulse count there before subtracting that count from the count of inflow pulses and before displaying the difference.

10. Apparatus for providing substantially instantaneous reading and recording of processing losses and gains from a continuous liquid process comprising:

means for continuously measuring both the product inflow into said process and the product outflow from said process, means for generating pulses corresponding to each of the inflow and outflow measurements, means for counting the pulses corresponding to the inflow and the pulses corresponding to the outflow, means for determining when a predetermined set number of pulses has been counted from either inflow or outflow, whichever is first, means for counting the number of pulses, the other flow pulse generating means produces thereafter before reaching that same predetermined set number, means for displaying the difference count while indicating whether it is a processing gain or loss, depending upon whether the inflow or outflow counting first reached said predetermined set number, and means for cyclically repeating the reading and recording sequence.

11. The apparatus of claim 10 wherein the means for continuously measuring both the product inflow into said process and the product outflow from said process comprises rotating flow meters connected at the inflow and outflow, respectively.

12. The apparatus of claim 11 wherein the means for generating pulses corresponding to each of the inflow and outflow measurements comprises pulse generators connected to the inflow and outflow flow meters, respectively.

13. The apparatus of claim 12 wherein the inflow and outflow pulse generators comprise rotary slotted discs axially coupled to said rotating flow meters and located between a light source and a light sensor so that rotation of the discs causes flashes of light to be passed to the light sensor resulting in emission of electrical pulses.

14. The apparatus of claim 12 wherein the pulse generators generate pulses at a rate of about one hundred pulses per pound of product flow.

15. The apparatus of claim 10 wherein means for counting inflow and outflow pulses comprises an inflow pulse counter and an outflow pulse counter, respectively.

16. The apparatus of claim 10 wherein the means for displaying the difference count comprises a digital display unit.

17. The apparatus of claim 10 wherein the means for displaying the difference count comprises a strip chart recorder.

18. The apparatus of claim 10 additionally comprising moisture compensation means whereby material inflow and outflow rates are compensated for moisture content.

19. The apparatus of claim 18 wherein the moisture compensation means comprises mechanical means to vary the inflow and the outflow to the respective sensors in accordance with predeteremined amounts of inflow and outflow moisture content in the material.

20. The apparatus of claim 18 wherein the moisture compensation means comprises means to vary the pulses generated by the pulse generator means in accordance with predetermined amounts of inflow and outflow moisture content in the material.

21. The apparatus of claim 10 additionally comprising temperature compensation means whereby material inflow and outflow rates are compensated for temperature content.

22. The apparatus of claim 21 wherein the temperature compensation means comprises mechanical means to vary the inflow and the outflow to the respective sensors in accordance with predetermined inflow and outflow temperatures of the material.

23. The apparatus of claim 21 wherein the temperature compensation means comprises means for electrically varying the pulses generated by the pulse generator means in accordance with predetermined inflow and outflow temperatures.

24. The apparatus of claim 21 wherein the temperature compensation means comprises means for automatically and virtually instantaneously sensing the material temperature at inflow and outflow and varying the pulses generated by the pulse generator means in proportion to the change in volume of the material caused by any said changes in temperature thereof.

25. The apparatus of claim 10 additionally comprising means for selectively averaging the number of inflow and outflow pulses prior to the counting thereof whereby the effect of any transient fluctuations in inflow or outflow does not materially affect the processing loss or gain reading.

26. The apparatus of claim 25 wherein the pulse averaging means comprises a switchable pulse frequency selector which selectively passes to the inflow and outflow counter means a fractional number of the pulses actually generated, for example, every second, fifth, tenth, twentieth, fiftieth, or hundredth pulse might be passed to the inflow and outflow counters in accordance with a particular setting of the frequency selector switch.

27. The apparatus of claim 10 additionally comprising test signal generation means whereby the electrical circuitry may be checked, adjusted or calibrated.

* * * * *